US011932827B2

(12) United States Patent
Biiliauw et al.

(10) Patent No.: US 11,932,827 B2
(45) Date of Patent: Mar. 19, 2024

(54) LIQUID HAND DISHWASHING DETERGENT COMPOSITION COMPRISING A MIXTURE OF 2-BRANCHED C13 ALKYL SULFATE ANIONIC SURFACTANTS

(71) Applicant: The Procter & Gamble Company, Cincinnati, OH (US)

(72) Inventors: Jan Julien Marie-Louise Biiliauw, Gentbrugge (BE); Kristof Crets, Buggenhout (BE); Rebecca Ann Langevin, Norwood, OH (US); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 284 days.

(21) Appl. No.: 17/337,968

(22) Filed: Jun. 3, 2021

(65) Prior Publication Data

US 2021/0380901 A1 Dec. 9, 2021

Related U.S. Application Data

(60) Provisional application No. 63/035,131, filed on Jun. 5, 2020.

(30) Foreign Application Priority Data

Jun. 12, 2020 (EP) .................................... 20179702

(51) Int. Cl.

| | |
|---|---|
| ***C11D 1/83*** | (2006.01) |
| ***C11D 1/14*** | (2006.01) |
| ***C11D 1/37*** | (2006.01) |
| ***C11D 1/66*** | (2006.01) |
| ***C11D 17/00*** | (2006.01) |

(52) U.S. Cl.

CPC ................ *C11D 1/146* (2013.01); *C11D 1/37* (2013.01); *C11D 1/66* (2013.01); *C11D 17/0008* (2013.01); *C11D 2111/18* (2024.01)

(58) Field of Classification Search

CPC .. C11D 1/146; C11D 1/37; C11D 1/66; C11D 1/75; C11D 1/90; C11D 1/83; C11D 3/0094

See application file for complete search history.

(56) References Cited

U.S. PATENT DOCUMENTS

| | | | | |
|---|---|---|---|---|
| 5,968,888 | A | 10/1999 | Blandiaux | |
| 6,008,181 | A | 12/1999 | Cripe | |
| 9,493,725 | B2 | 11/2016 | Vinson et al. | |
| 9,828,565 | B2 * | 11/2017 | Sharko | C10M 145/36 |
| 2005/0170990 | A1 | 8/2005 | Hecht | |
| 2006/0079420 | A1 * | 4/2006 | Wagner | A61Q 19/10 510/130 |
| 2007/0123447 | A1 | 5/2007 | Killeen | |
| 2018/0110710 | A1 | 4/2018 | Zhao et al. | |
| 2019/0010426 | A1 | 1/2019 | Scialla et al. | |
| 2019/0117544 | A1 * | 4/2019 | Zhao | A61Q 5/02 |
| 2021/0395643 | A1 | 12/2021 | Biiliauw et al. | |

FOREIGN PATENT DOCUMENTS

| | | | |
|---|---|---|---|
| EP | 0172742 | A2 | 8/1985 |
| EP | 2011545 | A2 | 1/2009 |
| EP | 2940115 | A1 | 11/2015 |
| EP | 2606111 | B1 | 12/2017 |
| EP | 3456799 | A1 | 3/2019 |
| EP | 3456805 | A1 | 3/2019 |
| EP | 3633016 | A1 | 4/2020 |
| JP | 2009102295 | A | 5/2009 |
| JP | 2020059843 | A | 4/2020 |
| WO | 9533025 | A1 | 12/1995 |
| WO | 2006041740 | A1 | 4/2006 |
| WO | 2019055255 | A1 | 3/2019 |

OTHER PUBLICATIONS

All Office Actions; U.S. Appl. No. 17/337,946, filed Jun. 3, 2021.
European Search Report for Application No./Patent No. 20179702.4-1105, dated Nov. 6, 2020, 7 pages.

* cited by examiner

*Primary Examiner* — Charles I Boyer
(74) *Attorney, Agent, or Firm* — Carolyn S. Powell; George H. Leal; Melissa Gartstein Krasovec

(57) ABSTRACT

The need for a liquid detergent composition suitable for washing dishes, fitting both in-sink as well as direct application habits, which provides reduced smearing when used in direct application dishwashing methods, while having good suds mileage especially under in-sink application habit, and good viscosity, is met by formulating the liquid detergent composition to comprise a surfactant system, which comprises an alkyl sulfate anionic surfactant comprising C13 alkyl sulfate anionic surfactant, the C13 alkyl sulfate anionic surfactant comprising a specific fraction of 2-branched C13 alkyl sulfate anionic surfactant, with a specific distribution of the 2-branching.

20 Claims, No Drawings

LIQUID HAND DISHWASHING DETERGENT COMPOSITION COMPRISING A MIXTURE OF 2-BRANCHED C13 ALKYL SULFATE ANIONIC SURFACTANTS

FIELD OF THE INVENTION

The present invention relates to a liquid detergent composition, especially a liquid hand dishwashing detergent.

BACKGROUND OF THE INVENTION

While some consumers prefer to wash their dishes by submerging them into diluted liquid detergent compositions in a sink, other consumers prefer to apply the liquid detergent composition to the dish directly, or via an implement such as a sponge. Such "direct application" methods provide improved grease cleaning, since a greater concentration of surfactant is applied directly to the stain. For such diluted in-sink application methods, consumers typically desire long lasting sudsing. The products are also desired not to have a too low viscosity as this would lead to a lower ability to control dosage, e.g. too fast run out of liquid detergent from the detergent bottle, as well as leaves the consumer perceiving the detergent product as lowly concentrated hence lower quality and value for money. For direct application methods, consumers desire long lasting grease cleaning and good initial as well as long lasting sudsing. Historically, diluted in-sink application was the dominant habit in most geographies. These days, while still some regional differences exist, a balance of both habits are regionally present, requiring formulators the challenge to deliver a product that meets both consumer groups' needs. Previously, when mainly targeting diluted in-sink applications, such "mileage" was extended by increasing the surfactant level. However, while increasing the surfactant level indeed improves the sudsing profile for the diluted liquid detergent composition, the higher surfactant level leads to poorer initial sudsing during direct application dishwashing. Moreover, a recurring issue with such "Direct Application" methods of washing dishes is smearing, whereby the soil on the dish is smeared over a wide area of the dish upon contact with the neat or lowly diluted detergent composition, rather than absorbed into the sponge. Such smearing leaves the dishes feeling greasy but also results in more effort needed to rinse the dishes. Such smearing is especially present when formulating linear or lowly branched surfactant materials.

Branched surfactants, and especially branched anionic and nonionic surfactants, have been used to improve grease cleaning during such direct application methods of cleaning. However, branching can lead to reduced viscosity which leads to higher product run-off from the soiled region of the dish during direct application. Moreover, such branched anionic and nonionic surfactants typically result in reduced suds mileage which leads to the user having the impression that the product has reduced efficacy.

Therefore, a need remains for a detergent composition suitable for washing dishes, fitting both in-sink as well as direct application habits, which provides good suds mileage especially under in-sink application habit, in combination with good viscosity.

EP 2606111 A, WO 9533025 A, U.S. Pat. No. 5,968,888 A, and US 2005/0170990 A disclose methods for hand washing dishes, including the step of contacting the dishes with the liquid detergent composition in undiluted form. US 2007/0123447 A1, WO 2006/041740 A1, U.S. Pat. No. 6,008,181 disclose dish washing compositions comprising branched surfactants. U.S. Pat. No. 9,493,725 B2 relates to detergent compositions and, more specifically, to detergent compositions containing a branched surfactant. EP3633016 A relates to a liquid hand-dishwashing composition which improved sudsing volume and longevity when washing dishware using diluted liquid hand dishwashing compositions, especially in the presence of greasy soil and particulate soil, while still providing the desired cleaning, wherein the composition is formulated with a surfactant system comprising alkyl sulfate surfactant and a co-surfactant, wherein the alkyl chain of the alkyl sulfate anionic surfactant has a mol fraction of C12 and C13 chains of at least 50%, and the C13/C12 mol ratio of the alkyl chain is at least 57/43. U.S. Pat. No. 9,828,565 B relates to a composition comprising a mixture of tridecanols wherein at least about 60 wt % of the mixture is linear tridecanol and at least about 10 wt % of the mixture is branched tridecanols wherein the branched tridecanols have branching on the second carbon atom, their derivatives, and their use in laundry detergents, cleaning products or as an agricultural adjuvant, an emulsifying agent, a lubricant additive, a pour point depressant, or a personal care ingredient.

SUMMARY OF THE INVENTION

The present invention relates to an alkyl sulfate anionic surfactant for use in liquid detergent compositions selected from the group consisting of hair shampoos, hair conditioners, shaving foams or gels, laundry detergents, hard surface cleaners, personal cleansers, bar soap, hand soap, shower gels, automatic dishwashing compositions, hand dishwashing compositions, and mixtures thereof, wherein the alkyl sulfate anionic surfactant comprises at least 90%, preferably at least 95% most preferably at least 98% by weight of the total alkyl sulfate anionic surfactant of C13 alkyl sulfate anionic surfactant, wherein the C13 alkyl sulfate anionic surfactant consists of: a) less than 40% by weight of the C13 alkyl sulfate anionic surfactant of linear C13 alkyl sulfate, and b) more than 60% by weight of the C13 alkyl sulfate anionic surfactant of 2-branched C13 alkyl sulfate anionic surfactant, wherein the 2-branched C13 alkyl sulfate anionic surfactant comprises: 25% or less by weight of the 2-branched alkyl chains of 2-pentyl octyl, and more than 25% by weight of the 2-branched of 2-methyl dodecyl, and c) less than 5% by weight of other branched C13 alkyl sulfate anionic surfactant, wherein a, b and c add up to 100% by weight of the C13 alkyl sulfate anionic surfactant.

The present invention further relates to a liquid detergent composition comprising from 5.0% to 60% by weight of the total composition of a surfactant system, wherein the surfactant system comprises: at least one alkyl sulfate anionic surfactant, wherein the alkyl sulfate anionic surfactant has a weight average degree branching of at least 45%, wherein the alkyl sulfate anionic surfactant comprises at least 10% by weight of the alkyl sulfate anionic surfactant of a C13 alkyl sulfate anionic surfactant, the C13 alkyl sulfate anionic surfactant comprises: less than 55% by weight of the C13 alkyl sulfate anionic surfactant of linear C13 alkyl sulfate, and more than 20% by weight of the C13 alkyl sulfate anionic surfactant of 2-branched C13 alkyl sulfate anionic surfactant, wherein the 2-branched C13 alkyl sulfate anionic surfactant comprises: 20% or less by weight of the 2-branched alkyl chains of 2-pentyl octyl, and more than 30% by weight of the 2-branched alkyl chains of 2-methyl dodecyl.

DETAILED DESCRIPTION OF THE INVENTION

It has been found that by formulating a liquid detergent composition to comprise a branched anionic surfactant, wherein the size and position of the branching is tightly controlled, such compositions have been found to have both improved viscosity and suds mileage especially during in-sink dishwashing methods.

Definitions

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of"." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a liquid detergent composition relating to suds character during the dishwashing process. The term "sudsing profile" of a liquid detergent composition includes suds volume generated upon dissolving and agitation, typically manual agitation, of the liquid detergent composition in the aqueous washing solution, and the retention of the suds during the dishwashing process. Preferably, hand dishwashing liquid detergent compositions characterized as having "good sudsing profile" tend to have high suds volume and/or sustained suds volume, particularly during a substantial portion of or for the entire manual dishwashing process. This is important as the consumer uses high suds as an indicator that sufficient liquid detergent composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing liquid detergent composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Alkyl Sulfate Anionic Surfactant

The alkyl sulfate anionic surfactant as described herein can be used for liquid detergent compositions selected from the group consisting of hair shampoos, hair conditioners, shaving foams or gels, laundry detergents, hard surface cleaners, personal cleansers, bar soap, hand soap, shower gels, automatic dishwashing compositions, hand dishwashing compositions, and mixtures thereof, and are particularly preferred for use in laundry detergents, hard surface cleaners, automatic dishwashing compositions, hand dishwashing compositions, and mixtures thereof, and most especially for hand dishwashing compositions.

The alkyl sulfate anionic surfactant comprises at least 90%, preferably at least 95%, most preferably at least 98% by weight of the total alkyl sulfate anionic surfactant of C13 alkyl sulfate anionic surfactant, wherein the C13 alkyl sulfate anionic surfactant consists of: a) less than 40% by weight of the C13 alkyl sulfate anionic surfactant of linear C13 alkyl sulfate, and b) more than 60% by weight of the C13 alkyl sulfate anionic surfactant of 2-branched C13 alkyl sulfate anionic surfactant, wherein the 2-branched C13 alkyl sulfate anionic surfactant comprises: 25% or less by weight of the 2-branched alkyl chains of 2-pentyl octyl, and more than 25% by weight of the 2-branched of 2-methyl dodecyl, and c) less than 5% by weight of other branched C13 alkyl sulfate anionic surfactant, wherein a, b and c add up to 100% by weight of the C13 alkyl sulfate anionic surfactant By C13 alkyl sulfate anionic surfactant, it is meant that the alkyl sulfate anionic surfactant comprises an alkyl chain which consists of 13 carbon atoms. Thus, for blends of alkyl sulfate anionic surfactant having an average chain length of 13 carbon atoms, only those alkyl sulfate anionic surfactants which comprise a C13 alkyl chain fall under the definition of C13 alkyl sulfate anionic surfactant. For blends of alkyl sulfate anionic surfactant comprising a mixture of different chain lengths including a C13 alkyl subfraction, independent of the average alkyl chain length, solely this C13 alkyl subfraction faals under the definition of C13 alkyl sulfate anionic surfactant.

With regards to the specific degree and type of C2-branching, the C13 alkyl sulfate anionic surfactant can consists of: less than 30%, preferably less than 5.0% to 25% by weight of the C13 alkyl sulfate anionic surfactant of linear C13 alkyl sulfate, and more than 70%, preferably from 75% to 95% by weight of the C13 alkyl sulfate anionic surfactant of 2-branched C13 alkyl sulfate anionic surfactant, and less than 3.0%, preferably from 0.1% to 2.0% by weight of the C13 alkyl sulfate anionic surfactant of other branched C13 alkyl sulfate anionic surfactant. The 2-branched C13 alkyl sulfate anionic surfactant can comprise from 5.0% to 20%, preferably from 10% to 20%, by weight of the 2-branched C13 alkyl sulfate of 2-pentyl-1-octyl sulfate anionic surfactant, and more than 30%, preferably from 30% to 50%, more preferably from 35% to 50%, by weight of the 2-branched C13 alkyl sulfate anionic surfactant of 2-methyl-1-dodecyl sulfate anionic surfactant. The remaining fraction within the 2-branched C13 alkyl sulfate can comprise 2-ethyl-1-undecyl sulfate anionic surfactant (preferably 25% or less, more preferably 20% or less, most preferably from 10% to 20% by weight of the 2-branched C13 alkyl sulfate), 2-propyl-1-decyl sulfate anionic surfactant (preferably 25% or less, more preferably 20% or less, most preferably from 10% to 20% by weight of the 2-branched C13 alkyl sulfate) and 2-butyl-1-nonyl sulfate anionic surfactant (preferably 25% or less, more preferably 20% or less, most preferably from 5% to 15% by weight of the 2-branched C13 alkyl sulfate).

As such, the alkyl chains of the C13 alkyl sulfate anionic surfactant are highly branched, having an increased methyl to pentyl branching ratio compared to other highly branched alcohols such as for example those sold under the Isalchem® trademark which have a much higher pentyl to methyl branching ratio. The average degree of branching is much higher than lower branched alkyl alcohols produced via the OXO process, such as those sold under the Neodol® trademark. Such Neodol® alkyl alcohols have a weight average degree of branching of around 18%.

The alkyl sulfate anionic surfactant can be selected from non-alkoxylated alkyl sulfate anionic surfactant, or alkoxylated alkyl sulfate anionic surfactant, or a mixture thereof.

When the C13 alkyl sulfate anionic surfactant is an alkoxylated anionic sulfate surfactant, the alkoxylated C13 anionic sulfate surfactant is preferably an ethoxylated C13 alkyl sulfate anionic surfactant. Preferably the C13 alkyl sulfate anionic surfactant has an average degree of alkoxylation of less than 5, preferably less than 3, more preferably less than 2 and more than 0.5, most preferably from 0.5 to 0.9, in order to improve low temperature physical stability and improve suds mileage of the compositions of the present invention. The average degree of alkoxylation is the mol average degree of alkoxylation (i.e., mol average alkoxylation degree) of all the alkyl sulfate anionic surfactant. Hence, when calculating the mol average alkoxylation degree, the moles of C13 non-alkoxylated sulfate anionic surfactant are included:

$$\text{Mol average alkoxylation degree}=(x1*\text{alkoxylation degree of surfactant }1+x2*\text{alkoxylation degree of surfactant }2+\ldots)/(x1+x2+\ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Suitable Alkyl Sulfate Anionic Surfactants can be Made Using the Following Process.

A two-step process can be used to produce branched aldehyde products from linear alpha olefin feedstocks, from which the alkyl sulfate anionic surfactants as described herein can be derived. The two-step process uses a rhodium organophosphorus catalyst for both a first process step and a second step. The first step is an isomerization reaction step and the second process step is a hydroformylation reaction step. The branched aldehydes can undergo a further hydrogenation step to produce branched alcohols.

The isomerization and hydroformylation reactions disclosed herein can be catalyzed by a rhodium organophosphorus catalyst which can be at least one of: (1) an organometallic complex of rhodium and one type of an organophosphorus ligand; (2) or an organometallic complex of rhodium and more than one type of an organophosphorus ligand.

The organophosphorous ligand can be a phosphine. In a nonlimiting example of a phosphine ligand, the phosphine ligand can be triphenylphosphine. The organophosphorous ligand can also be a phosphite. In a nonlimiting example of a phosphite ligand, the phosphite ligand can be tris (2,4-di-t-butylphenyl) phosphite. A mixture of organophosphorous ligands of different types can also be used, such as a mixture of a phosphine and a phosphite. In a nonlimiting example of a mixture of organophosphorous ligands, the organophosphorous ligands can be a mixture of triphenylphosphine and tris (2,4-di-t-butylphenyl) phosphite. The reaction system can contain an inert high-boiling solvent, for example a polyalphaolefin. The first catalyst can be formed when the molar ratio of phosphorous to rhodium is in a range of 1:1 to 1000:1, or 5:1 to 50:1, or 15:1 to 25:1. The rhodium concentration can be in a range of 1 ppm to 1000 ppm, or 10 ppm to 200 ppm, or 25 ppm to 75 ppm. The CO to H2 molar ratio can be in a range of 10:1 to 1:10, or 2:1 to 1:2, or 1.3:1 to 1:1.3.

During the isomerization reaction, the first step can be a reaction isomerizing a linear alpha olefin in the presence of Carbon Monoxide (CO) and Hydrogen (H2) at a first pressure. The isomerizing can be catalyzed by the rhodium organophosphorus catalyst which can be at least one of: (1) an organometallic complex of rhodium and one type of an organophosphorus ligand; (2) or an organometallic complex of rhodium and more than one type of an organophosphorus ligand. The isomerization reactions can produce an isomerized olefin comprising linear internal olefins of the same or different types.

The isomerization step can be performed at a temperature in a range of 30° C. to 500° C., or 50° C. to 150° C., or 70° C. to 100° C. The isomerization step can be performed at a gauge pressure in a range of 0.1 bar (0.01 MPa above atmospheric) to 10 bar (1 MPa above atmospheric), or 0.5 bar (0.05 MPa above atmospheric) to 5 bar (0.5 MPa above atmospheric), or 1 bar (0.1 MPa above atmospheric) to 2 bar (0.2 MPa above atmospheric).

The isomerizing step can produce a reaction product comprising a 20 wt. % or greater isomerized olefin, or a 40 wt. % or greater isomerized olefin, or a 60 wt. % or greater isomerized olefin, or a 90 wt. % or greater isomerized olefin.

During the hydroformylation reaction step, the isomerized olefin is hydroformylated in the presence of CO and H2 at a second pressure higher than the first pressure to produce a branched aldehyde. The hydroformylation reaction can be catalyzed by the rhodium organophosphorus catalyst which can be at least one of: (1) an organometallic complex of rhodium and one type of an organophosphorus ligand; (2) or an organometallic complex of rhodium and more than one type of an organophosphorus ligand. The resultant branched aldehyde is a 2-alkyl branched aldehyde. The linear alpha olefin is 1-dodecene and the branched aldehyde is a branched C13 aldehyde.

The hydroformylating step can be performed at a temperature in a range of 30° C. to 500° C., or 50° C. to 150° C., or 70° C. to 100° C. The hydroformylating step can be performed at a gauge pressure in a range of 5 bar (0.5 MPa above atmospheric) to 400 bar (40 MPa above atmospheric), or 10 bar (1.0 MPa above atmospheric) to 100 bar (10 MPa above atmospheric), or 15 bar (1.5 MPa above atmospheric) to 20 bar (2 MPa above atmospheric).

The hydroformylating step can produce a reaction product comprising a 25 wt. % or greater branched aldehyde, or a 40 wt. % or greater branched aldehyde, or a 60 wt. % or greater branched aldehyde, or a 90 wt. % or greater branched aldehyde.

The products of the hydroformylation reaction can be distilled. The process can have the step of separating the branched aldehyde products resulting from hydroformylation as an overhead product from the first catalyst stream via a distillation process. The distillation step can be performed at a temperature in a range of 100° C. to 200° C., or 125° C. to 175° C. The distillation step can be performed under vacuum at a pressure of less than 500 millibar absolute (0.05 MPa), or less than 100 millibar absolute (0.01 MPa), or less than 30 millibar absolute (0.003 MPa), The process can also have the steps of: hydrogenating the branched aldehyde product in the presence of a hydrogenation catalyst to produce a branched alcohols product composition. The hydrogenating catalyst can be a base metal catalyst, a supported nickel catalyst, a supported cobalt catalyst, a Raney® (W. R. Grace & Co., 7500 Grace Drive, Columbia, MD 21044) nickel catalyst or a precious metal catalyst. The hydrogenating step can be performed at a temperature in a range of 30° C. to 500° C., or 50° C. to 200° C., or 100° C. to 150° C. The hydrogenating step can be performed at a gauge pressure in a range of 5 bar (0.5 MPa above atmospheric) to 400 bar (40 MPa above atmospheric), or 10 bar (1 MPa above atmospheric) to 100 bar (10 MPa above atmospheric), or 30 bar (3 MPa above atmospheric) to 50 bar (SMPa above atmospheric).

The hydrogenating step can produce a reaction product comprising 25 wt % or greater branched alcohols, or 40 wt % or greater branched alcohols, or 60 wt % or greater branched alcohols, or 90 wt. % or greater branched alcohols.

The C12 olefin source used in the hydroformylation to make the starting C13 aldehydes and subsequent alcohols of use in the present invention can have low levels of impurities that lead to impurities in the starting C13 alcohol and therefore also in the C13 alkyl sulfate. While not intending to be limited by theory, such impurities present in the C12 olefin feed can include vinylidene olefins, branched olefins, paraffins, aromatic components, and low levels of olefins having chain-lengths other than 12 carbons. Branched and vinylidene olefins are typically at or below 5% in C12 alpha olefin sources. Impurities in the resulting C13 alcohols can include low levels of linear and branched alcohols in the range of C10 to C16 alcohols, especially C11 and C15 alcohols, typically less than 2% by weight of the mixture, preferably less than 1%; low levels of branching in positions other than the 2-alkyl position resulting from branched and vinylidene olefins are typically less than about 5% by weight of the alcohol mixture, preferably less than 2%; paraffins and olefins, typically less than 1% by weight of the alcohol mixture, preferably less than about 0.5%; low levels of aldehydes with a carbonyl value typically below 500 mg/kg, preferably less than about 200 mg/kg. These impurities in the alcohol can result in low levels of paraffin, linear and branched alkyl sulfates having total carbon numbers other than C13, and alkyl sulfates with branching in positions other than the 2-alkyl location, wherein these branches can vary in length, but are typically linear alkyl chains having from 1 to 6 carbons. The step of hydroformylation can also yield impurities, such as linear and branched paraffins, residual olefin from incomplete hydroformylation, as well as esters, formates, and heavy-ends (dimers, trimers). Impurities that are not reduced to alcohol in the hydrogenation step may be removed during the final purification of the alcohol by distillation.

Alkyl sulfates are typically prepared by the reaction of fatty alcohols with sulfur trioxide ($SO_3$) or its derivatives or by the reaction of unsaturated compounds with sulfuric acid. Processes using sulfur trioxide in particular have gained prominence for fabricating alkyl sulfate anionic surfactants for use in detergent compositions.

Suitable derivatives of Sulfur trioxide include sulfur trioxide complexes such as chlorosulfonic acid, sulfuric acid, or sulfamic acid. Sulfur trioxide is preferred since it tends to result in more pure products. The sulfation reaction typically takes place in a continuous process using a cascade, falling film or tube bundle reactor, with the sulfur trioxide being applied in an equimolar or small excess, usually in a temperature range of 20° C. to 60° C., with the reaction temperature being determined at least partially by the solidification point of the fatty alcohol in the reaction. The reaction typically results in the acid form of the alkyl sulfate anionic surfactant which is typically neutralised in a subsequent step, using an alkali such as sodium hydroxide, potassium hydroxide, magnesium hydroxide lithium hydroxide, calcium hydroxide, ammonium hydroxide, monoethanolamine, diethanolamine, triethanolamine, monoisopropanolamine, diamines, polyamines, primary amines, secondary amines, tertiary amines, amine containing surfactants, and mixtures thereof.

Also, it is well known that the process of sulfating fatty alcohols to yield alkyl sulfate anionic surfactants also yields various impurities. The exact nature of these impurities depends on the conditions of sulfation and neutralization. Generally, however, the impurities of the sulfation process include one or more inorganic salts, unreacted fatty alcohol, and olefins ("The Effect of Reaction By-Products on the Viscosities of Sodium Lauryl Sulfate Solutions," Journal of the American Oil Chemists' Society, Vol. 55, No. 12, p. 909-913 (1978), C. F. Putnik and S. E. McGuire). The level of non alkyl sulfate impurities in the alkyl sulfate anionic surfactant of the present invention can be less than 6% by weight, preferably less than 4% by weight, and most preferably less than 2% by weight of the alkyl sulfate anionic surfactant.

For alkyl alkoxy sulfates, the fatty alcohol is first alkoxylated before sulfation. Alkoxylation is a process that reacts lower molecular weight epoxides (oxiranes), such as ethylene oxide, propylene oxide, and butylene oxide with the fatty alcohol. These epoxides are capable of reacting with the fatty alcohol using various base or acid catalysts. In base catalyzed alkoxylation, an alcoholate anion, formed initially by reaction with a catalyst (alkali metal, alkali metal oxide, carbonate, hydroxide, or alkoxide), nucleophilically attacks the epoxide.

Traditional alkaline catalysts for alkoxylation include potassium hydroxide and sodium hydroxide, which give rise to a somewhat broader distribution of alkoxylates. Other catalysts have been developed for alkoxylation that provide a more narrow distribution of alkoxylate oligomers. Suitable examples of narrow range alkoxylation catalysts include many alkaline earth (Mg, Ca, Ba, Sr, etc.) derived catalysts, Lewis acid catalysts, such as Zirconium dodecanoxide sulfate, and certain boron halide catalysts. A specific average degree of alkoxylation may be achieved by selecting the starting quantities of fatty alcohol and ethylene oxide or by blending together varying amounts of alkoxylated surfactants differing from one another in average degree of alkoxylation.

Liquid Detergent Composition

The liquid detergent composition can be provided by a process comprising the step of combining the aforementioned alkyl sulfate anionic surfactant with an additional surfactant, and optionally a further ingredient, as described herein.

The liquid detergent composition is preferably a liquid hand dishwashing detergent composition. The liquid detergent composition is preferably an aqueous liquid detergent composition. As such, the composition can comprise from 50% to 85%, preferably from 50% to 75%, by weight of the total composition of water.

Preferably, the pH of the composition is from about 6 to about 14, preferably from about 7 to about 12, or more preferably from about 7.5 to about 10, as measured at 10% dilution in distilled water at 20° C. The pH of the composition can be adjusted using pH modifying ingredients known in the art.

The composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof, using the viscosity method described herein.

Surfactant System

The liquid detergent composition comprises from 5.0% to 60%, preferably from 8.0% to 45%, most preferably from 15% to 40%, by weight of the total composition of a surfactant system.

The surfactant system comprises at least one alkyl sulfate anionic surfactant having a weight average degree branching of at least 45%, preferably from 45% to 80%, more preferably from 45% to 70%, most preferably from 45% to 65%. The alkyl sulfate anionic surfactant comprises at least 10% by weight of the alkyl sulfate anionic surfactant of a C13 alkyl sulfate anionic surfactant.

The C13 alkyl sulfate anionic surfactant comprises less than 55%% by weight of the C13 alkyl sulfate anionic surfactant of linear C13 alkyl sulfate, and more than 20% by weight of the C13 alkyl sulfate anionic surfactant of 2-branched C13 alkyl sulfate anionic surfactant, wherein the 2-branched C13 alkyl sulfate anionic surfactant comprises: 20% or less by weight of the 2-branched alkyl chains of 2-pentyl octyl, and more than 30% by weight of the 2-branched alkyl chains of 2-methyl dodecyl.

The alkyl sulfate anionic surfactant can comprise other alkyl sulfate anionic surfactants beyond C13 alkyl sulfate anionic surfactant as defined herein. Such alkyl sulfate anionic surfactant blends can have an average alkyl chain length which is from C12 to C14, with an average chain length of C13 being preferred.

The surfactant system can comprise at least one alkyl sulfate anionic surfactant. The surfactant system can comprise from 60% to 90%, preferably from 65% to 85%, more preferably from 70% to 80% by weight of the surfactant system of the alkyl sulfate anionic surfactant.

The alkyl sulfate anionic surfactant can comprise from 15% to 80%, preferably from 30% to 70% by weight of the alkyl sulfate anionic surfactant of the C13 alkyl sulfate anionic surfactant.

The C13 alkyl sulfate anionic surfactant can comprise: less than 50%, preferably from 20% to 40% by weight of the C13 alkyl sulfate anionic surfactant of linear C13 alkyl sulfate, and more than 25%, preferably from 25% to 75% by weight of the C13 alkyl sulfate anionic surfactant of 2-branched C13 alkyl sulfate anionic surfactant. The 2-branched C13 alkyl sulfate anionic surfactant can comprise 5.0% to 20%, preferably from 10% to 20%, by weight of the 2-branched C13 alkyl sulfate of 2-pentyloctyl sulfate anionic surfactant, and more than 30% to 60%, preferably more than 30% to 50%, by weight of the 2-branched C13 alkyl sulfate anionic surfactant of 2-methyldodecyl sulfate anionic surfactant.

The mol average alkyl chain length of the alkyl sulfate anionic surfactant can be from 8 to 18, preferably from 10 to 14, more preferably from 12 to 14, most preferably from 12 to 13 carbon atoms, in order to provide a combination of improved grease removal and enhanced speed of cleaning.

The mol average alkyl chain length of the alkyl sulfate anionic surfactant can be derived from the carbon chain length distribution of the anionic surfactant. The carbon chain length distribution of the alkyl chains of the alkyl sulfate anionic surfactants can be obtained from the technical data sheets from the suppliers for the surfactant or constituent alkyl alcohol. Alternatively, the chain length distribution and average molecular weight of the fatty alcohols, used to make the alkyl sulfate anionic surfactant, can also be determined by methods known in the art. Such methods include capillary gas chromatography with flame ionisation detection on medium polar capillary column, using hexane as the solvent. The chain length distribution is based on the starting alcohol and alkoxylated alcohol. As such, the alkyl sulfate anionic surfactant should be hydrolysed back to the corresponding alkyl alcohol and alkyl alkoxylated alcohol before analysis, for instance using hydrochloric acid.

The weight average branching combined with the formulation of the specific type of branching, described herein, has been found to provide improved low temperature stability, initial foam generation and suds longevity, as well as enabling increased product viscosities. The alkyl sulfate anionic surfactant can have a weight average degree of branching of from 45% to 80%, preferably from 45% to 70%, more preferably from 45% to 65%. The alkyl sulfate anionic surfactant can comprise at least 5%, preferably at least 10%, most preferably at least 25%, by weight of the alkyl sulfate anionic surfactant, of branching on the C2 position (as measured counting carbon atoms from the sulfate group for non-alkoxylated alkyl sulfate anionic surfactants, and the counting from the alkoxy-group furthest from the sulfate group for alkoxylated alkyl sulfate anionic surfactants). It has been found that formulating the inventive compositions using alkyl sulfate anionic surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the liquid detergent composition of organic solvent, while still having improved low temperature stability. Higher surfactant branching also provides faster initial suds generation, but typically less suds mileage. By formulating the C13 alkyl sulfate anionic surfactant into compositions according to the invention, a good suds mileage profile is achieved despite the increased branching level. Beyond it has been found to be more difficult to build highly viscous products when using highly branched formulations. By formulating with the C13 alkyl sulfate anionic surfactant of use in the present invention, higher viscous products can be achieved.

The weight average degree of branching for an anionic surfactant mixture can be calculated using the following formula:

$$\text{Weight average degree of branching (\%)}=[(x1^*\text{wt \% branched alcohol 1 in alcohol 1}+x2^*\text{wt \% branched alcohol 2 in alcohol 2}+\ldots)/(x1+x2+\ldots)]^*100$$

wherein x1, x2, . . . are the weight in grams of each alcohol in the total alcohol mixture of the alcohols which were used as starting material before (alkoxylation and) sulfation to produce the alkyl (alkoxy) sulfate anionic surfactant. In the weight average degree of branching calculation, the weight of the alkyl alcohol used to form the alkyl sulfate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulfate anionic surfactant.

Suitable counterions include alkali metal cation earth alkali metal cation, alkanolammonium or ammonium or substituted ammonium, but preferably sodium.

The alkyl sulfate anionic surfactant can be selected from non-alkoxylated alkyl sulfate anionic surfactant, or alkoxylated alkyl sulfate anionic surfactant, or a mixture thereof. A blend of non-alkoxylated alkyl sulfate anionic surfactant and alkoxylated alkyl sulfate anionic surfactant is preferred.

As such, the alkyl sulfate anionic surfactant can, and preferably comprises additional alkyl sulfate anionic surfactant, besides the C13 alkyl sulfate anionic surfactant. The additional alkyl sulfate anionic surfactant can be non-alkoxylated or alkoxylated or a mixture thereof, though the additional alkyl sulfate anionic surfactant preferably comprises alkoxylated alkyl sulfate anionic surfactant, more preferably ethoxylated alkyl sulfate anionic surfactant.

The additional alkyl sulfated anionic surfactant can have an average alkyl chain length of from 8 to 18, preferably from 10 to 14, more preferably from 12 to 14, most preferably from 12 to 13 carbon atoms. The additional alkyl sulfated anionic surfactant can have an average degree of alkoxylation such that the alkyl sulfate anionic surfactant has an average degree of alkoxylation of less than 5, preferably less than 3, more preferably from 0.5 to 2.0, most preferably from 0.5 to 0.9.

The additional alkyl sulfate anionic surfactant can have a weight average degree of branching such that the alkyl sulfate anionic surfactant has a weight average degree of branching of more than 45%, preferably from 45% to 80%, more preferably from 45% to 70%, most preferably from 45% to 65%.

When the alkyl sulfate anionic surfactant is an alkoxylated sulfate surfactant, the alkoxylated anionic sulfate surfactant is preferably an ethoxylated alkyl sulfate anionic surfactant. Preferably the alkyl sulfate anionic surfactant has an average degree of alkoxylation of less than 5, preferably less than 3, more preferably less than 2 and more than 0.5, most preferably from 0.5 to 0.9, in order to improve low temperature physical stability and improve suds mileage of the compositions of the present invention. The average degree of alkoxylation is the mol average degree of alkoxylation (i.e., mol average alkoxylation degree) of all the alkyl sulfate anionic surfactant. Hence, when calculating the mol average alkoxylation degree, the mols of non-alkoxylated sulfate anionic surfactant are included:

$$\text{Mol average alkoxylation degree}=(x1^{*}\text{alkoxylation degree of surfactant }1+x2^{*}\text{alkoxylation degree of surfactant }2+\ldots)/(x1+x2+\ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Preferred alkyl alkoxy sulfates are alkyl ethoxy sulfates

Suitable examples of commercially available alkyl sulfate anionic surfactants that can be added in addition to the C13 alkyl sulfate anionic surfactant include: those derived from alcohols sold under the Neodol® brand-name by Shell, or the Lial®, Isalchem®, Alfol®, Nacol®, Nafol®, Isofol®, Marlipal®, and Safol® brand-names by Sasol, or some of the natural alcohols produced by The Procter & Gamble Chemicals company. Such alkyl sulfate anionic surfactants can be non-alkoxylated, alkoxylated, or combinations thereof. When alkoxylated, the alkyl sulfate anionic surfactant is preferably ethoxylated.

The starting alkyl alcohols can be blended and sulfated together in order to arrive at the alkyl sulfate anionic surfactant. Alternatively, individual alkyl sulfate anionic surfactants, or mixtures of alkyl sulfate anionic surfactants can be blended together to arrive at the alkyl sulfate anionic surfactant.

The alcohols can be blended in order to achieve the desired mol distribution of alkyl chain lengths, based on the relative fractions of different alkyl chain lengths within the starting alcohols, as obtained from the technical data sheets from the suppliers or from analysis using methods known in the art.

The performance can be affected by the width of the alkoxylation distribution of the alkoxylated alkyl sulfate anionic surfactant, including grease cleaning, sudsing, low temperature stability and viscosity of the finished product. The alkoxylation distribution, including its broadness can be varied through the selection of catalyst and process conditions when making the alkoxylated alkyl sulfate anionic surfactant.

Without wishing to be bound theory, through tight control of processing conditions and feedstock material compositions, both during alkoxylation especially ethoxylation and sulfation steps, the amount of 1,4-dioxane by-product within alkoxylated especially ethoxylated alkyl sulfates can be kept minimal. A further reduction of 1,4-dioxane by-product can be achieved by a consequent 1,4-dioxane stripping, distillation, evaporation, centrifugation, microwave irradiation, molecular sieving or catalytic or enzymatic degradation step. Processes to control 1,4-dioxane content within alkoxylated/ethoxylated alkyl sulfates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl) phenyl]-2 (1H)-pyridone, 3 a-hydroxy-7-oxo-mixture of cholanic acid, 3-(N-methyl amino)-L-alanine, and mixtures thereof. Tight 1,4-dioxane control across the raw material and detergent making process enables product formulations with remaining 1,4-dioxane content of below 10 ppm, preferably below 5 ppm, even more preferably below 1 ppm.

The surfactant system can comprise further anionic surfactant. If present, the further anionic surfactant can be present at a level of less than 30%, preferably less than 10% by weight of the anionic surfactant. More preferably, the surfactant system is free of further anionic surfactant. When present, such anionic surfactant can include sulfonate surfactants, such as alkylbenzene sulfonate, sulfosuccinate, alkyl carboxylate (soaps), alkyl ethoxy carboxylate, acyl sarcosinate, acyl glycinate, acyl glutamate, rhamnolipid, sophorolipid anionic surfactants.

The surfactant system can further comprise a co-surfactant selected from the group consisting of an amphoteric surfactant, a zwitterionic surfactant, and mixtures thereof, preferably amine oxide, betaine, and mixtures thereof, more preferably an amine oxide surfactant.

The composition can comprise from 0.1% to 20%, more preferably from 0.5% to 15% and especially from 2% to 10% by weight of the liquid detergent composition of the co-surfactant, to improve surfactant packing and hence grease cleaning and suds mileage.

The surfactant system of the liquid detergent composition of the present invention preferably comprises from 10% to 40%, preferably from 15% to 35%, more preferably from 20% to 30%, by weight of the surfactant system of a co-surfactant.

In order to improve surfactant packing after dilution and hence improve suds mileage, the surfactant system can comprise the co-surfactant in addition to the alkyl sulfate anionic surfactant, such that the alkyl sulfate anionic surfactant to the co-surfactant weight ratio is from 1:1 to 8:1, preferably from 2:1 to 5:1, more preferably from 2.5:1 to 4:1.

Suitable amine oxide surfactant can be linear or branched, though linear are preferred. Suitable linear amine oxides are typically water-soluble, and characterized by the formula R1-N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxyethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulfobetaine (INCI Sultaines) as well as the Phosphobetaine, and preferably meets formula (I):

$$R^1—[CO—X(CH_2)_n]_x—N^+(R^2)(R_3)—(CH_2)_m—[CH(OH)—CH_2]_y—Y^-$$

Wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulfo betaines of formula (Ic) and the amido sulfobetaine of formula (Id):

$$R^1—N(CH_3)_2—CH_2COO^- \quad (IIa)$$

$$R^1—CO—NH—(CH_2)_3—N^+(CH_3)_2—CH_2COO^- \quad (IIb)$$

$$R^1—N^+(CH_3)_2—CH_2CH(OH)CH_2SO_3^- \quad (IIc)$$

$$R^1—CO—NH—(CH_2)_3—N^+(CH_3)_2—CH_2CH(OH)CH_2SO_3^- \quad (IId)$$

in which R1 has the same meaning as in formula (I). Particularly preferred are the carbobetaines [i.e. wherein Y—=COO— in formula (I)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Nonionic Surfactant:

The surfactant system can further comprise nonionic surfactant, preferably at a level of from 1.0% to 25%, more preferably from 1.25% to 15%, most preferably from 1.5% to 5.0% by weight of the surfactant system. Suitable nonionic surfactants include alkoxylated nonionic surfactants, and mixtures thereof.

Preferred alkoxylated non-ionic surfactants are linear or branched, primary or secondary alkyl alkoxylated non-ionic surfactants, preferably alkyl ethoxylated nonionic surfactants, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol.

Additional Ingredients:

The composition may further comprise at least one active selected from the group consisting of: amphiphilic alkoxylated polyalkyleneimine, cyclic polyamine or oligoamine, salt, hydrotrope, organic solvent, and mixtures thereof.

Amphiphilic Alkoxylated Polyalkyleneimine:

The composition of the present invention may further comprise from about 0.05% to about 2%, preferably from about 0.07% to about 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

Preferably, the amphiphilic alkoxylated polyalkyleneimine is an alkoxylated polyethyleneimine polymer comprising a polyethyleneimine backbone having a weight average molecular weight range of from 100 to 5,000, preferably from 400 to 2,000, more preferably from 400 to 1,000 Daltons. The polyethyleneimine backbone comprises the following modifications:

(i) one or two alkoxylation modifications per nitrogen atom, dependent on whether the modification occurs at an internal nitrogen atom or at an terminal nitrogen atom, in the polyethyleneimine backbone, the alkoxylation modification consisting of the replacement of a hydrogen atom on by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

(ii) a substitution of one C1-C4 alkyl moiety and one or two alkoxylation modifications per nitrogen atom, dependent on whether the substitution occurs at a internal nitrogen atom or at an terminal nitrogen atom, in the polyethyleneimine backbone, the alkoxylation modification consisting of the replacement of a hydrogen atom by a polyalkoxylene chain having an average of about 1 to about 50 alkoxy moieties per modification wherein the terminal alkoxy moiety is capped with hydrogen, a C1-C4 alkyl or mixtures thereof; or (iii) a combination thereof.

For example, but not limited to, below is shown possible modifications to terminal nitrogen atoms in the polyethyleneimine backbone where R represents an ethylene spacer and E represents a C1-C4 alkyl moiety and X— represents a suitable water soluble counterion:

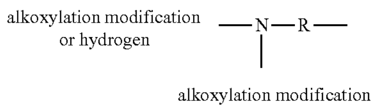

or

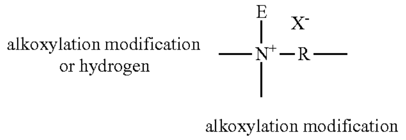

Also, for example, but not limited to, below is shown possible modifications to internal nitrogen atoms in the polyethyleneimine backbone where R represents an ethylene spacer and E represents a $C_1$-$C_4$ alkyl moiety and X— represents a suitable water soluble counterion:

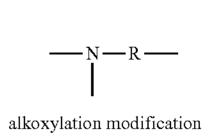

or

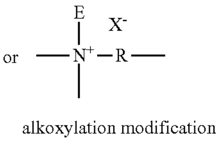

The alkoxylation modification of the polyethyleneimine backbone consists of the replacement of a hydrogen atom by a polyalkoxylene chain having an average of about 1 to about 50 alkoxy moieties, preferably from about 20 to about 45 alkoxy moieties, most preferably from about 30 to about 45 alkoxy moieties. The alkoxy moieties are selected from ethoxy (EO), propoxy (PO), butoxy (BO), and mixtures thereof. Alkoxy moieties solely comprising ethoxy units are outside the scope of use for the invention though. Preferably, the polyalkoxylene chain is selected from ethoxy/propoxy block moieties. More preferably, the polyalkoxylene chain is ethoxy/propoxy block moieties having an average degree of ethoxylation from about 3 to about 30 and an average degree of propoxylation from about 1 to about 20, more preferably ethoxy/propoxy block moieties having an average degree of ethoxylation from about 20 to about 30 and an average degree of propoxylation from about 10 to about 20.

More preferably the ethoxy/propoxy block moieties have a relative ethoxy to propoxy unit ratio between 3 to 1 and 1 to 1, preferably between 2 to 1 and 1 to 1. Most preferably the polyalkoxylene chain is the ethoxy/propoxy block moieties wherein the propoxy moiety block is the terminal alkoxy moiety block.

The modification may result in permanent quaternization of the polyethyleneimine backbone nitrogen atoms. The degree of permanent quaternization may be from 0% to about 30% of the polyethyleneimine backbone nitrogen atoms. It is preferred to have less than 30% of the polyethyleneimine backbone nitrogen atoms permanently quaternized. Most preferably the degree of quaternization is about 0%.

A preferred amphiphilic alkoxylated polyethyleneimine polymer has the general structure of formula (II):

(II)

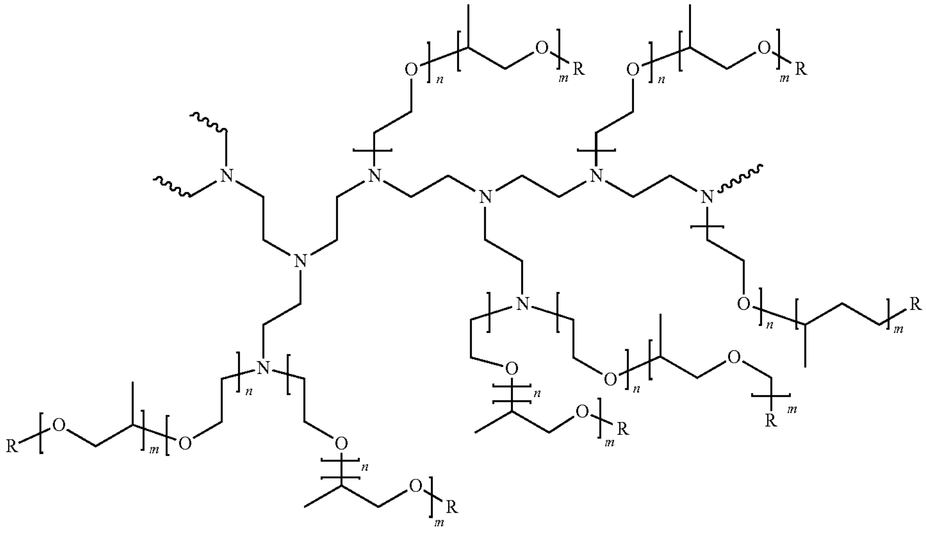

wherein the polyethyleneimine backbone has a weight average molecular weight of about 600, n of formula (II) has an average of about 10, m of formula (II) has an average of about 7 and R of formula (II) is selected from hydrogen, a $C_1$-$C_4$ alkyl and mixtures thereof, preferably hydrogen. The degree of permanent quaternization of formula (II) may be from 0% to about 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (II) but wherein the polyethyleneimine backbone has a weight average molecular weight of about 600 Da, n of Formula (II) has an average of about 24, m of Formula (II) has an average of about 16 and R of Formula (II) is selected from hydrogen, a $C_1$-$C_4$ alkyl and mixtures thereof, preferably hydrogen. The degree of permanent quaternization of Formula (II) may be from 0% to about 22% of the polyethyleneimine backbone nitrogen atoms, and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Cyclic Polyamine or Oligoamine:

The composition can comprise a cyclic polyamine or oligoamine having amine functionalities that helps cleaning. The composition of the invention preferably comprises from about 0.1% to about 3%, more preferably from about 0.2% to about 2%, and especially from about 0.5% to about 1%, by weight of the composition, of the cyclic polyamine or oligoamine.

The amine can be subjected to protonation depending on the pH of the cleaning medium in which it is used. Preferred cyclic polyamine or oligoimines have the following Formula (III):

(III)

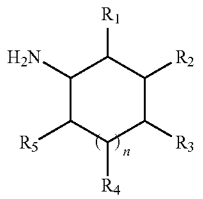

wherein $R_1$, $R_2$, $R_3$, $R_4$ and $R_5$ are independently selected from the group consisting of NH2, —H, linear or branched alkyl having from about 1 to about 10 carbon atoms, and linear or branched alkenyl having from about 1 to about 10 carbon atoms, n is from about 1 to about 3, preferably n is 1, and wherein at least one of the Rs is NH2 and the remaining "Rs" are independently selected from the group consisting of NH2, —H, linear or branched alkyl having about 1 to about 10 carbon atoms, and linear or branched alkenyl having from about 1 to about 10 carbon atoms. Preferably, the cyclic polyamine or oligoamine is a diamine, wherein n is 1, $R_2$ is NH2, and at least one of $R_1$, $R_3$, $R_4$ and $R_5$ is CH3 and the remaining Rs are H.

The cyclic polyamine or oligoamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine or oligoamine for use with the liquid detergent composition of the present invention are cyclic polyamine or oligoamine selected from the group consisting of: 2-methylcyclohexane-1,3-diamine, 4-methylcyclohexane-1,3-diamine and mixtures thereof. These specific cyclic polyamine or oligoamines work to improve suds and grease cleaning profile through-out the dishwashing process when formulated together with the surfactant system of the composition of the present invention.

Salt:

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulfate, and mixtures thereof. Sodium chloride is most preferred.

Hydrotrope:

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulfonate.

Organic Solvent:

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol.

Adjunct Ingredients

The liquid detergent composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Method of Washing

The compositions of the present invention can be used to wash dishes by various methods, depending on the level and type of soil or grease, and consumer preference.

For instance, the compositions can be used in a method of manually washing dishware in which the composition is diluted before application to the soiled dishware. The method comprises the steps of delivering a composition of the present invention to a volume of water to form a wash solution and immersing the dishware in the solution. The dishware is be cleaned with the composition in the presence of water. Optionally, the dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware are contacted with an effective amount, typically from about 0.5 mL to about 20 mL (per about 25 dishes being treated), preferably from about 3 mL to about 10 mL, of the liquid detergent composition, preferably in liquid form, of the present invention diluted in water. The actual amount of liquid detergent composition used will be based on the judgment of the user, and will typically depend upon factors such as the particular product formulation of the liquid detergent composition, including the concentration of active ingredients in the liquid detergent composition, the number of soiled dishes to be cleaned, the degree of soiling on the dishes, and the like. Generally, from about 0.01 mL to about 150 mL, preferably from about 3 mL to about 40 mL of a liquid detergent composition of the invention is combined with from about 2,000 mL to about 20,000 mL, more typically from about 5,000 mL to about 15,000 mL of water in a sink. The soiled dishware are immersed in the sink containing the diluted liquid detergent compositions then obtained, before contacting the soiled surface of the dishware with a cloth, sponge, or similar cleaning implement. The cloth, sponge, or similar cleaning implement may be immersed in the liquid detergent composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

The present invention can also be used in methods of direct application of the liquid detergent composition. Such methods comprise the step of contacting said composition in its neat form, with the dish. Said composition may be poured directly onto the dish from its container. Alternatively, the composition may be applied first to a cleaning device or implement such as a brush, a sponge, a nonwoven material, or a woven material. The cleaning device or implement, and consequently the liquid dishwashing composition in its neat form, is then directly contacted to the surface of each of the soiled dishes, to remove said soiling. The cleaning device or implement is typically contacted with each dish surface for a period of time range from 1 to 10 seconds, although the actual time of application will depend upon factors such as the degree of soiling of the dish. The contacting of said cleaning device or implement to the dish surface is preferably accompanied by concurrent scrubbing. Alternatively, the device or implement may be immersed in the liquid hand dishwashing detergent composition in its neat form, in a small container that can accommodate the cleaning device. Prior to the application of said composition, the soiled dish may be immersed into a water bath, or held under running water, to wet the surface of the dish. The method may comprise an optional rinsing step, after the step of contacting the liquid detergent composition with the dishes.

The compositions of the present invention are particularly useful for grease cleaning and improving suds mileage, both during direct application dishwashing methods and in dishwashing methods whereby the detergent composition is diluted (for instance in a sink), as well as initial foam formation and smearing avoidance during direct application dishwashing methods, and improving low temperature stability and providing highly viscous formulations.

Test Methods

Suds Mileage:

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. A defined amount of a test composition, depending on the targeted composition concentration (here: 0.24 wt %), is dispensed through a plastic pipette at a flow rate of 0.67 mL/sec at a height of 37 cm above the bottom surface of a sink (dimension: 300 mm diameter and 288 mm height) into a water stream (here: water hardness: 15 gpg, water temperature: 42° C.) that is filling up the sink to 4 L with a constant pressure of 4 bar.
2. An initial suds volume generated (measured as average foam height X sink surface area and expressed in $cm^3$) is recorded immediately after end of filling.
3. A fixed amount (6 mL) of soil is immediately injected into the middle of the sink.
4. The resultant solution is mixed with a metal blade (10 cm×5 cm) positioned in the middle of the sink at the air liquid interface under an angle of 45 degrees rotating at 85 RPM for 20 revolutions.
5. Another measurement of the total suds volume is recorded immediately after end of blade rotation.
6. Steps 3-5 are repeated until the measured total suds volume reaches a minimum level of 400 $cm^3$. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample.
9. Calculate a Suds Mileage Index by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

Soil composition is produced through standard mixing of the components described in Table 4.

TABLE 4

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

Viscosity:

The viscosity is measured with a Brookfield RT Viscometer using spindle 21 at 12 RPM at 20° C.

EXAMPLES

Examples of suitable alkyl sulfate anionic surfactants and their synthesis: The following are representative and non-limiting examples of suitable alkyl sulfate anionic surfactants, including a non-limiting method of synthesis.

Using the above-described processes, the alcohol compositions described below in Alcohol Examples 1 and 2 are obtained and analyzed by gas chromatography with flame ionization detection (GC/FID). The samples are prepared as a 1% (w/v) dichloromethane solution and injected into a capillary GC Column: DB-1 HT 15 m×0.25 mm ID, 0.1 p m film thickness, using an oven temperature program [initial temperature 80° C. (1 min), ramp 10° C./min to 220° C., ramp 30° C./min to 350° C. (1 min)] for a total run time of 19 minutes. Additional GC parameters include Column Flow: 1.4 ml/min ($H_2$), Injection Temperature: 300° C., Sample Amount: 1 p L, Split Ratio: 1/400, FID Temperature: 350° C., $H_2$ Flow: 40 mL/min, Air Flow: 400 mL/min, and Makeup Gas Flow: 25 mL/min.

Alcohol Example 1. Synthesis of Narrow Branched Tridecanol (Alcohol 1)

A C12 linear alpha olefin feedstock (1-Dodecene) was obtained from the Chevron Phillips Chemical Company LP, as identified by product name AlphaPlus® 1-Dodecene (Chevron Phillips Chemical Company LP, P.O. Box 4910, The Woodlands, TX 77387-4910, US, phone (800) 231-3260). The homogeneous rhodium organophosphorus catalyst used in this example is prepared in a high pressure, stainless steel stirred autoclave. To the autoclave was added 0.027 wt. % Rh(CO)2ACAC ((Acetylacetonato)dicarbonylrhodium(I)), 1.36 wt. % tris (2,4,-di-t-butylphenyl) phosphite ligand and 98.62 wt. % Synfluid® PAO 4 cSt (Chevron Phillips Chemical Company LP, P.O. Box 4910, The Woodlands, TX 77387-4910) inert solvent. The mixture was heated at 80° C. in the presence of a CO/H2 atmosphere and 2 bar (0.2 MPa above atmospheric) gauge pressure for four hours to produce the active rhodium catalyst solution (109 ppm rhodium, P:Rh molar ratio=20). The 1-Dodecene linear alpha olefin was added to the rhodium catalyst solution in the autoclave producing a starting reaction mixture with a rhodium concentration of 35 ppm. The alpha olefin feed was then isomerized at 80° C. in the presence of a CO/H2 atmosphere and 1 bar (0.1 MPa above atmospheric) gauge pressure for 10 hours. The isomerized olefin was then hydroformylated at 70° C. in the presence of a CO/H2 atmosphere and 20 bar (2 MPa above atmospheric) gauge pressure for 8 hours. The molar ratio of CO to H2 in both the isomerization step and the hydroformylation step was equal to 1:1.15. The resulting hydroformylation reaction product was flash distilled at 140-150° C. and 25 millibar to recover the rhodium catalyst solution as a bottoms product and recover a branched C13 Aldehyde overheads product with a composition comprising:

| | |
|---|---|
| 1-Tridecanal | 13.9 wt % |
| 2-Methyl-dodecanal | 28.3 wt % |
| 2-Ethyl-undecanal | 15.2 wt % |
| 2-Propyl-decanal | 14.5 wt % |
| 2-Butyl-nonanal | 13.6 wt % |
| 2-Pentyl-octanal | 12.6 wt % |
| Other | 1.9 wt % |

The weight % branching in the branched C13 aldehyde product was 86.2%.

The branched C13 aldehyde product was hydrogenated in a high pressure, Inconel 625 stirred autoclave at 150 C and 20 bar (2 MPa above atmospheric) hydrogen gauge pressure. The hydrogenation catalyst used was a Raney® Nickel 3111 (W. R. Grace & Co., 7500 Grace Drive, Columbia, MD 21044, US, phone 1-410-531-4000) catalyst used at a 0.25 wt. % loading. The aldehyde was hydrogenated for 10 hours and the resultant reaction mixture was filtered to produce a branched C13 alcohol product (Alcohol 1 in Table 1) comprising:

| | |
|---|---|
| 1-Tridecanol | 13.36 wt % |
| 2-Methyl-dodecanol | 28.95 wt % |
| 2-Ethyl-undecanol | 16.25 wt % |
| 2-Propyl-decanol | 13.92 wt % |
| 2-Butyl-nonanol | 13.46 wt % |
| 2-Pentyl-octanol | 13.02 wt % |
| Other | 1.04 wt % |

The weight % 2-alkyl branching in the branched C13 alcohol product was 85.6%.

Alkyl Sulfate Example 1. Synthesis of Narrow Branched Tridecanol Sulfate Using a Falling Film Sulfation Reactor The alcohol from Alcohol Example 1 is sulfated in a falling film using a Chemithon single 15 mm×2 m tube reactor using SO3 generated from a sulfur burning gas plant operating at 5.5 lb/hr sulfur to produce 3.76% SO3 on a volume basis. Alcohol feed rate is 15.2 kg/hour and feed temperature was 81 F. Conversion of the alcohol to alcohol sulfate acid mix was achieved with 96.5% completeness. Neutralization with 50% sodium hydroxide is completed at ambient process temperature to 0.65% excess sodium hydroxide. 33 gallons of sodium neutralized C13 narrow branched Alcohol Sulfate paste. Analyses by standard Cationic SO3 titration method determines final average product activity to be 73.4%. The average unsulfated level is 2.10% w/w.

Alkyl Sulfate Example 2. Synthesis of Narrow Branched Tridecanol Sulfate Using a Falling Film Sulfation Reactor with Amine Oxide Addition The alcohol from Alcohol Example 1 is sulfated in a falling film using a Chemithon single 15 mm×2 m tube reactor using SO3 generated from a sulfur burning gas plant operating at 5.0 lb/hr sulfur to produce 3.76% SO3 on a volume basis. Alcohol feed rate is 13.8 kg/hour and feed temperature was 75 F. Conversion of the alcohol to alcohol sulfate acid mix was achieved with 97% completeness. Neutralization is co-neutralized with 50% sodium hydroxide and with C12/14 dimethyl amine oxide at ambient process temperature to a pH of 8.0. 68 kilograms of the C13 narrow branched Alcohol Sulfate/Amine oxide paste was made to a target activity of 51.7% Alcohol sulfate and 11.76% C12/14 dimethyl amine oxide.

Suds Mileage and Viscosity Test:

The effect of type of branching within the alkyl chain of the alkyl sulfate anionic surfactants was evaluated for suds mileage performance as well as for their ability to sustain viscosity within hand dishwashing liquid formulations, following the test methods described herein.

Test Materials:

The relative sudsing performance and viscosity impact was determined for alkyl sulfate anionic surfactants based on the starting alcohols summarized in table 1. All starting alcohols ex table 1 consisted essentially of C13 alkyl chains. Alcohol 1 used to make the alkyl sulfate anionic surfactants in the inventive composition has a type of branching as described in the claims and were produced following the making process described herein. Alcohol A has a pentyl-type branching above that required for the C13 alkyl sulfates of use in the present invention and a methyl-type branching below that required for the C13 alkyl sulfates of use in the present invention.

TABLE 1

| Alkyl chain distribution of starting C13 alcohols | | |
|---|---|---|
| | Alcohol A (Isalchem 13 ex Sasol) | Alcohol 1 from Alcohol Example 1 |
| Alkyl chain length | C13 | C13 |
| Linear content+ | 5.3% | 13.4% |
| 2-Alkyl Branched C13 Alcohol+ | 91.3% | 85.6% |
| Other+++ | 3.4% | 1.0% |
| Branch distribution: | | |
| 2-methyl-1-dodecanol++ | 21% | 34% |
| 2-ethyl-1-undecanol++ | 17% | 19% |
| 2-propyl-1-decanol++ | 19% | 16% |
| 2-butyl-1-nonanol++ | 18% | 16% |
| 2-pentyl-1-octanol++ | 26% | 15% |

+by weight of starting C13 alcohol

++by weight of branched C13 alcohol

+++such as isomers with branches in non-C2 positions, paraffins, alcohols with chain-lengths other than 13 carbons The starting C13 alcohols of Table 1 as well as the further (non-ethoxylated and ethoxylated) alcohols mentioned in table 2b were individually sulfated in the pilot plant, prior to being mixed in order to achieve the alkyl sulphate blends as mentioned in table 2a and 2b, and hence having the desired average degree of branching and average degree of ethoxylation, while having branching distributions either of use in the present invention (Examples 1 and 2, through use of C13 alcohol 1), or in comparative compositions (Examples A and B, through use of C13 alcohols A). The resulting alkyl sulfate distribution in the different AES compositions, is summarized in table 2c.

TABLE 2a

| Resultant alkyl (ethoxy) sulfate blends (wt % of AES-as anion) | | | | | | | |
|---|---|---|---|---|---|---|---|
| alkyl sulfate blend | Safol 23-3 sulfate | Safol 23 sulfate | alcohol 1 sulfate | alcohol A sulfate | Natural C12-14 sulfate | Avg branching | Avg EO |
| Ex 1 | 26.91% | 46.20% | 16.32% | 0.00% | 10.64% | 50.5% | 0.6 |
| Ex A* | 26.91% | 46.20% | 0.00% | 16.32% | 10.64% | 51.4% | 0.6 |
| Ex 2 | 26.71% | 21.13% | 41.66% | 0.00% | 10.57% | 59.1% | 0.6 |
| Ex B* | 26.71% | 21.13% | 0.00% | 41.66% | 10.57% | 61.6% | 0.6 |

*Comparative

TABLE 2b

| Resultant alkyl (ethoxy) sulfate blends (based on the starting alcohol/alcohol ethoxylate-wt % of total starting alcohol/alcohol ethoxylate) | | | | | | | |
|---|---|---|---|---|---|---|---|
| Alcohol blend | Safol 23-3 (Sasol) | Safol 23 (Sasol) | alcohol 1 | alcohol A | Natural C12-14 (P&G) | Avg branching | Avg EO |
| Ex 1 | 29.38% | 44.49% | 15.9% | 0% | 10.24% | 50.5% | 0.6 |
| Ex A* | 29.38% | 44.49% | 0% | 15.9% | 10.24% | 51.4% | 0.6 |
| Ex 2 | 29.09% | 20.30% | 40.48% | 0% | 10.14% | 59.1% | 0.6 |
| Ex B* | 29.09% | 20.30% | 0% | 40.48% | 10.14% | 61.6% | 0.6 |

*Comparative

The alkyl sulfate blends of Table 2a to 2b have the below weight % distribution of A(E)S anions.

TABLE 2c

| resulting alkyl sulfate distribution in the different AES compositions | | | | | |
|---|---|---|---|---|---|
| alkyl sulfate blend | Wt % total C13 alkyl sulfate vs. total alkyl sulfate | wt % linear C13 alkyl sulfate vs. total C13 alkyl sulfate | wt % 2-alkyl branched C13 alkyl sulfate vs. total C13 alkyl sulfate | wt % 2-methyl-dodecyl sulfate vs. 2-alkyl branched C13 alkyl sulfate | wt % 2-pentyl-octyl sulfate vs. 2-alkyl branched C13 alkyl sulfate |
| Ex 1 | 50% | 35% | 31% | 41% | 13% |
| Ex A* | 50% | 33% | 33% | 29% | 23% |
| Ex 2 | 63% | 25% | 58% | 36% | 15% |
| Ex B* | 62% | 20% | 63% | 23% | 25% |

Table 3 summarizes the liquid hand dishwashing detergent compositions that have been prepared using the resultant alkyl ethoxy sulfate blends as described in Table 2a to 2c. The AES level is expressed in Table 3 as the sodium salt. The liquid detergent formulations were prepared through mixing together of the individual raw materials at room temperature using a batch type process.

TABLE 3

| Liquid hand dishwashing detergent composition | |
|---|---|
| Individual Material | Level (as 100% active) |
| C1213AE0.6S (anion from table 2c) | 23.6 |
| C1214 dimethyl amine oxide | 6.4 |
| ethanol | 3.0 |
| PPG (MW2000) | 1.2 |
| NaCl | 0.8 |
| Water and minors (perfume, dye, preservative) | Balance to 100% |
| pH (as 10% solution in demineralized water) | 9 |

The data in Table 4 summarizes the suds mileage and viscosity of the detergent compositions.

As can be seen from comparative Examples A and B, when the detergent composition is formulated to comprise C13 alkyl sulfate anionic surfactant which comprises more than 20 wt % of the 2-branched C13 alkyl sulfate anionic surfactant of 2-pentyl-octyl sulfate, and less than 30 wt % of the 2-branched C13 alkyl sulfate anionic surfactant of 2-methyl-dodecyl sulfate, the composition suds mileage provided by this comparative composition is lower, as is the viscosity.

As can be seen from Examples 1 and 2, compositions comprising 2-methyl-dodecyl sulfate and 2-pentyl-octyl sulfate anionic surfactants at the levels required by the present invention, while having a weight average degree of branching for the alkyl (ethoxy) sulfate of greater than 45% results in both improved suds mileage and viscosity.

TABLE 4

| suds mileage and viscosity as a function of AES composition: | | | | | | | |
|---|---|---|---|---|---|---|---|
| alkyl sulfate blend | wt % branching of AES | wt % linear C13 alkyl sulfate vs. total C13 alkyl sulfate | wt % 2-alkyl branched C13 alkyl sulfate vs. total C13 alkyl sulfate | wt % 2-methyl-dodecyl sulfate vs. 2-alkyl branched C13 alkyl sulfate | wt % 2-pentyl-octyl sulfate vs. 2-alkyl branched C13 alkylsulfate | Suds mileage | Viscosity Cps |
| Ex 1 | 50.5% | 35% | 31% | 41% | 13% | 100 | 513 |
| Ex A* | 51.4% | 33% | 33% | 29% | 23% | 90 | 396 |
| Ex 2 4 | 59.1% | 25% | 58% | 36% | 15% | 111 | 577 |
| Ex B* | 61.6% | 20% | 63% | 23% | 25% | 90 | 253 |

*comparative

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An alkyl sulfate anionic surfactant mixture for use in liquid detergent compositions selected from the group consisting of hair shampoos, hair conditioners, shaving foams or gels, laundry detergents, hard surface cleaners, personal cleansers, bar soap, hand soap, shower gels, automatic dishwashing compositions, hand dishwashing compositions, and mixtures thereof, wherein the alkyl sulfate anionic surfactant comprises at least about 90% by weight of the total alkyl sulfate anionic surfactant of C13 alkyl sulfate anionic surfactant, wherein the C13 alkyl sulfate anionic surfactant consists of:

a. less than about 40% by weight of the C13 alkyl sulfate anionic surfactant of linear C13 alkyl sulfate, and b. more than about 60% by weight of the C13 alkyl sulfate anionic surfactant of 2-branched C13 alkyl sulfate anionic surfactant, wherein the 2-branched C13 alkyl sulfate anionic surfactant comprises:

from about 5.0% to 20% by weight of the 2-branched alkyl chains of 2-pentyl octyl, and more than about 25% by weight of the 2-branched alkyl chains of 2-methyl dodecyl, and c. from about 0.1% to about 2.0% by weight of other branched C13 alkyl sulfate anionic surfactant, wherein a, b and c add up to 100% by weight of the C13 alkyl sulfate anionic surfactant.

2. The alkyl sulfate anionic surfactant according to claim 1, wherein the alkyl sulfate anionic surfactant comprises at least about 95% by weight of the total alkyl sulfate anionic surfactant of C13 alkyl sulfate anionic surfactant.

3. The alkyl sulfate anionic surfactant according to claim 1, wherein the C13 alkyl sulfate anionic surfactant consists of:

a. less than about 30% by weight of the C13 alkyl sulfate anionic surfactant of linear C13 alkyl sulfate, and more than about 70% by weight of the C13 alkyl sulfate anionic surfactant of 2-branched C13 alkyl sulfate anionic surfactant.

4. The alkyl sulfate anionic surfactant according to claim 1, wherein the 2-branched C13 alkyl sulfate anionic surfactant comprises:

more than about 30% by weight of the 2-branched C13 alkyl sulfate anionic surfactant of 2-methyldodecyl sulfate anionic surfactant.

5. The alkyl sulfate anionic surfactant mixture according to claim 1, wherein the alkyl sulfate anionic surfactant mixture further comprises an alkoxylated alkyl sulfate anionic surfactant.

6. A liquid detergent composition comprising from about 5.0% to about 60% by weight of the total composition of a surfactant system, wherein the surfactant system comprises:

a) at least one alkyl sulfate anionic surfactant, wherein the alkyl sulfate anionic surfactant has a weight average degree branching of at least about 45%, wherein the alkyl sulfate anionic surfactant comprises at least about 10% by weight of the alkyl sulfate anionic surfactant of a C13 alkyl sulfate anionic surfactant, the C13 alkyl sulfate anionic surfactant comprises:

(i) less than about 55%% by weight of the C13 alkyl sulfate anionic surfactant of linear C13 alkyl sulfate, and (ii) more than about 20% by weight of the C13 alkyl sulfate anionic surfactant of 2-branched C13 alkyl sulfate anionic surfactant, wherein the 2-branched C13 alkyl sulfate anionic surfactant comprises: from about 5.0% to about 20% by weight of the 2-branched alkyl chains of 2-pentyl octyl, and more than about 30% by weight of the 2-branched alkyl chains of 2-methyl dodecyl.

7. The composition according to claim 6, wherein the liquid detergent composition comprises from about 8.0% to about 45% by weight of the total composition of the surfactant system.

8. The composition according to claim 6, wherein the surfactant system comprises from about 60% to about 90% by weight of the surfactant system of the alkyl sulfate anionic surfactant.

9. The composition according to claim 6, wherein the average alkyl chain length of the alkyl sulfate anionic surfactant is from 8 to 18 carbon atoms.

10. The composition according to claim 6, wherein the alkyl sulfate anionic surfactant has a weight average degree of branching of from about 45% to about 80%.

11. The composition according to claim 6, wherein the alkyl sulfate anionic surfactant comprises from about 15% to about 80% by weight of the alkyl sulfate anionic surfactant of the alkyl sulfate consisting of C13 alkyl sulfate anionic surfactant.

12. The composition according to claim 6, wherein the C13 alkyl sulfate anionic surfactant comprises:

a. less than about 50% by weight of the C13 alkyl sulfate anionic surfactant of linear C13 alkyl sulfate, and b. more than about 25% by weight of the C13 alkyl sulfate anionic surfactant of 2-branched C13 alkyl sulfate anionic surfactant.

13. The composition according to claim 6, wherein the 2-branched C13 alkyl sulfate anionic surfactant comprises:

more than about 30% to about 60% by weight of the 2-branched C13 alkyl sulfate anionic surfactant of 2-methyldodecyl sulfate anionic surfactant.

14. The liquid detergent composition according to claim 6, wherein the alkyl sulfate anionic surfactant mixture further comprises an alkoxylated alkyl sulfate anionic surfactant.

15. The composition according to claim 6, wherein the surfactant system comprises less than about 30% by weight of the surfactant composition of a further anionic surfactant.

16. The composition according to claim 6, wherein the surfactant system further comprises a co-surfactant selected from the group consisting of an amphoteric surfactant, a zwitterionic surfactant, and mixtures thereof.

17. The composition according to claim 16, wherein the surfactant system comprises the co-surfactant at a level of from about 0.1% to about 20% by weight of the liquid detergent composition.

18. The composition according to claim 16, wherein the surfactant system comprises the co-surfactant at a level of from about 10% to about 40% by weight of the surfactant system.

19. The composition according to claim 16, wherein the surfactant system comprises the alkyl sulfate anionic surfactant and the co-surfactant in a weight ratio of from about 1:1 to about 8:1.

20. The composition according to claim 6, wherein the surfactant system further comprises nonionic surfactant, at a level of from about 1.0% to about 25% by weight of the surfactant system.

* * * * *